Reissued Aug. 17, 1937

Re. 20,474

UNITED STATES PATENT OFFICE 20,474

MANUFACTURE OF ETHYL ALCOHOL

Floyd J. Metzger, New York, N. Y., assignor to Air Reduction Company, Inc., New York, N. Y., a corporation of New York No Drawing. Original No. 2,050,443, dated August 11, 1936, Serial No. 578,415, December 1, 1931. Application for reissue May 29, 1937, Serial No. 145,514

17 Claims. (Cl. 260—156)

This invention relates to the production of alcohol from ethylene and is a continuation in part of my prior application Serial No. 547,452 filed June 27, 1931.

According to the process of such prior application, ethyl alcohol is produced continuously by passing the ethylene, in admixture with suitable proportions of steam, into intimate contact with a dilute non-volatile mineral acid catalyst, and particularly a sulfuric acid catalyst, while maintaining the catalyst at a high temperature and maintaining the gases under a high pressure, with resulting conversion of the ethylene into alcohol, which is subsequently condensed. The process can advantageously be carried out in a cyclic manner by maintaining a circulating stream of ethylene under a high pressure, admixing therewith steam in suitable proportions, passing the resulting mixture through or into contact with the acid catalyst at a high temperature, condensing the alcohol and excess steam while maintaining the high pressure, and recycling the ethylene with suitable further additions of ethylene and steam in the further carrying out of the process.

As described in said prior application, the pressures employed are in general in excess of one hundred pounds or two hundred pounds, and higher pressures around six hundred pounds or higher to the square inch are more advantageous.

I have found that such process can be carried out to particular advantage at pressures around one thousand pounds to the square inch or higher, and with proper regulation of the proportion of steam and ethylene, the concentration of the acid, the temperature, etc. I have found that, by operating at such high pressures, alcohol can readily be produced free or substantially free from ether, and without the formation of objectionable condensation products or other by-products which might be expected at such high pressures.

The present process can advantageously be carried out with dilute sulfuric acid as a catalyst using, for example, sulfuric acid initially having a concentration of around 15 to 30% sulfuric acid ($H_2SO_4$) and at temperatures ranging from 250 to 300° C. The sulfuric acid should in general have a strength materially less than 50% and, with the high pressures used, the sulfuric acid should not in general have a strength of much greater than 40 to 45%. It seems probable that, during the process, some ethyl sulfate is formed, so that the catalyst is a mixture of sulfuric acid and an ethyl sulfate. Promoters can be employed in admixture with the acid catalyst.

Instead of using a sulfuric acid catalyst, other acid catalysts can be employed, for example, a phosphoric acid catalyst, or a mixture of phosphoric and sulfuric acid.

As pointed out in said prior application, the temperatures employed, the strength of the acid catalyst, the pressure, and the ratio of steam to ethylene employed, are more or less inter-dependent and should be regulated and correlated. In general, it is advantageous to use an amount of steam equal to or somewhat in excess of the ethylene, as pointed out in said prior application.

The process will be illustrated by the following examples:

Ethylene and steam in about equal proportions were intimately admixed and passed at one thousand pounds pressure into intimate contact with a sulfuric acid catalyst containing initially about 30% $H_2SO_4$ and maintained at a temperature of about 255 to 260° C. The resulting gases were cooled to condense the alcohol and water while maintaining the gases under pressure, and the ethylene was then recycled and admixed with additional steam, and with ethylene to make up for that converted into alcohol, and the gases were then heated and recycled through the catalyst. The alcohol condensed was in the form of alcohol of about 22 to 23% alcohol. About one liter of alcohol (figured as 100% alcohol) was obtained per hour for each two liters of acid catalyst employed; but these proportions will vary and can be varied somewhat by variations in strength of the acid and the proportions of steam to ethylene, and the pressure and temperature, etc.

While I have mentioned a pressure of around one thousand pounds to the square inch in the above example, this pressure can be increased considerably above that, up to several thousand pounds per square inch.

For example, operating at about two thousand pounds to the square inch and with an acid catalyst initially containing around 18 to 20% $H_2SO_4$ and with a catalyst temperature of around 255 to 260° C. and with somewhat more than twice as much ethylene as steam, an even stronger alcohol product was obtained, e. g. around 25 to 30% alcohol in the condensate.

In the carrying out of this process, it will be evident that the apparatus employed should be capable of withstanding the high pressures required in the process at the high temperatures maintained, particularly in the catalytic chamber; and that the apparatus which comes into contact with the acid catalyst at the high temperature and pressure should be resistant to the action of the acid catalyst. Apparatus can, however, readily be constructed capable of withstanding several thousand pounds to the square inch so that the gases, e. g. ethylene, can be recycled in the process, admixed with steam, or passed through a boiler where steam is generated to form the desired mixture of ethylene and steam, the mixture then passed through the catalyst, the resulting gases cooled to condense the alcohol and water, and the ethylene then recycled with further addition of ethylene to make up for that converted into alcohol.

The process can thus be advantageously carried out as a continuous process in which the acid catalyst maintains its strength at approximately the same concentration throughout the process, so long as the proportion of steam and ethylene, the temperature and the pressure are maintained approximately constant, and as soon as the equilibrium conditions are once reached and maintained.

Ethylene, admixed with steam, when subjected to unusually high pressures, of around one to several thousand pounds to the square inch, is highly compressed, and the resulting mixture of steam and ethylene occupies a relatively small volume as compared with the volume occupied at ordinary atmospheric pressure. These high pressures promote the formation of alcohol with the use of relatively dilute acid catalysts; while the admixture of the steam with the ethylene under these high pressures nevertheless prevents objectionable polymerization or formation of objectionable by-products, enabling a relatively pure aqueous alcohol to be produced.

The alcohol condensed from the gases can of course be rectified and distilled to obtain pure alcohol therefrom.

I claim:

1. The method of producing ethyl alcohol in a continuous manner, which comprises passing a mixture of ethylene and water vapor in regulated proportions into intimate contact with a dilute non-volatile inorganic acid catalyst maintained at an effective and substantially uniform catalytic strength and temperature, the temperature not exceeding about 300° C., and under a pressure in excess of about one thousand pounds to the square inch, the strength of the inorganic acid catalyst being materially less than 50% acid and cooling the resulting gases to condense the alcohol therefrom.

2. The method of producing ethyl alcohol in a continuous manner, which comprises passing a mixture of ethylene and water vapor in regulated proportions into intimate contact with a dilute sulphuric acid catalyst maintained at an effective and substantially uniform catalytic strength and temperature, the temperature not exceeding about 300° C., and under a pressure in excess of about one thousand pounds to the square inch, the strength of the sulphuric acid catalyst being materially less than 50% acid and cooling the resulting gases to condense the alcohol therefrom.

3. The process of producing ethyl alcohol in a continuous manner, which comprises passing a mixture of ethylene and water vapor in regulated proportions into intimate contact with a dilute non-volatile inorganic acid catalyst maintained at an effective and substantially uniform catalytic strength and temperature, the temperature not exceeding about 300° C., under a pressure in excess of about one thousand pounds to the square inch, the strength of the acid catalyst being materially less than 50% acid cooling the resulting gases while maintaining the high pressure thereon to condense the alcohol therefrom, admixing additional water vapor with the remaining ethylene while maintaining it at the high pressure, and also admixing additional ethylene, and passing the resulting mixture of ethylene and water vapor while maintained under a high pressure again into intimate contact with the dilute acid catalyst to effect further formation of alcohol in a cyclic manner.

4. The process of producing ethyl alcohol in a continuous manner, which comprises passing a mixture of ethylene and water vapor into intimate contact with a dilute sulphuric acid catalyst of a strength of about 15 to 30% $H_2SO_4$ and maintained at a temperature in the neighborhood of 255 to 260° C. while maintaining the gases under a pressure in excess of about one thousand pounds to the square inch, and condensing the alcohol from the resulting gases.

5. The process of producing ethyl alcohol in a continuous manner, which comprises passing a mixture of ethylene and water vapor in regulated proportions under a pressure in excess of about one thousand pounds to the square inch into intimate contact with a dilute sulphuric acid catalyst maintained at a strength of around 15 to 30% sulphuric acid and at a temperature in the neighborhood of 250 to 260° C. with resulting production of ethyl alcohol together with more or less unchanged ethylene and water vapor, cooling the resulting gases to condense alcohol and water therefrom, admixing additional water vapor with the ethylene, and additional ethylene therewith, and recirculating the resulting admixed gases into contact with the acid catalyst while maintaining the high pressure on the ethylene and admixed gases during such recycling.

6. The method of producing ethyl alcohol in a continuous manner, which comprises passing a mixture of ethylene and water vapor in regulated proportions into intimate contact with a dilute non-volatile inorganic acid catalyst maintained at an effective and substantially uniform catalytic strength of less than 45% acid and at a temperature of 250° to 300° C. and under a pressure in excess of about one thousand pounds to the square inch and cooling the resulting gases to condense the alcohol therefrom.

7. The method of producing ethyl alcohol in a continuous manner, which comprises passing a mixture of ethylene and water vapor in regulated proportions into intimate contact with a dilute non-volatile inorganic acid catalyst maintained at an effective and substantially uniform catalytic strength and temperature, the temperature not exceeding about 300° C., and under a pressure in excess of about two thousand pounds to the square inch, the strength of the sulfuric acid catalyst being materially less than 45% and cooling the resulting gases to condense the alcohol therefrom.

8. The method of producing ethyl alcohol in a continuous manner, which comprises passing a mixture of ethylene and water vapor in regulated proportions into intimate contact with a dilute sulphuric acid catalyst maintained at an effective and substantially uniform catalytic strength materially less than 45% acid and at a temperature of 250 to 300° C. and under a pressure in excess of about two thousand pounds to the square inch, and cooling the resulting gases to condense the alcohol therefrom.

9. The method of producing ethyl alcohol substantially free from ether in a continuous manner, which comprises passing a mixture of ethylene and water vapor, with the water vapor greater in amount than the ethylene, into intimate contact with a dilute sulphuric acid catalyst having a strength which is not in excess of about 30% sulphuric acid and at a temperature within the range of about 250 to 300° C., and under a pressure in excess of about 1000 pounds per square inch, continuously withdrawing the resulting gases and vapors and cooling the same to condense aqueous alcohol therefrom, and regulating the temperature, pressure and proportions of steam to ethylene to maintain the dilute acid catalyst of approximately uniform catalytic strength.

10. The method of producing ethyl alcohol in a continuous manner, which comprises passing a mixture of ethylene and water vapor in regulated proportions into intimate contact with a dilute aqueous phosphoric acid catalyst maintained at an effective and substantially uniform catalytic strength materially less than 45% acid and at a temperature not exceeding about 300° C., and under a pressure in excess of about 1000 pounds to the square inch, continuously drawing off the resulting gases and vapors and cooling the same to condense aqueous alcohol therefrom.

11. The method of producing ethyl alcohol in a continuous manner, which comprises passing a mixture of ethylene and water vapor in regulated proportions into intimate contact with a dilute non-volatile inorganic acid catalyst maintained at an effective and substantially uniform catalytic strength and temperature, the temperature not exceeding about 300° C., and under a pressure in excess of about one thousand pounds to the square inch, the strength of the inorganic acid catalyst being materially less than 50% acid.

12. The method of producing ethyl alcohol in a continuous manner, which comprises passing a mixture of ethylene and water vapor in regulated proportions into intimate contact with a dilute sulphuric acid catalyst maintained at an effective and substantially uniform catalytic strength and temperature, the temperature not exceeding about 300° C., and under a pressure in excess of about one thousand pounds to the square inch, the strength of the sulphuric acid catalyst being materially less than 50% acid.

13. The process of producing ethyl alcohol in a continuous manner, which comprises passing a mixture of ethylene and water vapor into intimate contact with a dilute sulphuric acid catalyst of a strength of about 15 to 30% $H_2SO_4$ and maintained at a temperature in the neighborhood of 255 to 260° C. while maintaining the gases under a pressure in excess of about one thousand pounds to the square inch.

14. The method of producing ethyl alcohol in a continuous manner, which comprises passing a mixture of ethylene and water vapor in regulated proportions into intimate contact with a dilute non-volatile inorganic acid catalyst maintained at an effective and substantially uniform catalytic strength of less than 45% acid and at a temperature of 250° to 300° C. and under a pressure in excess of about one thousand pounds to the square inch.

15. The method of producing ethyl alcohol in a continuous manner, which comprises passing a mixture of ethylene and water vapor in regulated proportions into intimate contact with a dilute non-volatile inorganic acid catalyst maintained at an effective and substantially uniform catalytic strength and temperature, the temperature not exceeding about 300° C., and under a pressure in excess of about two thousand pounds to the square inch, the strength of the sulphuric acid catalyst being materially less than 45%.

16. The method of producing ethyl alcohol in a continuous manner, which comprises passing a mixture of ethylene and water vapor in regulated proportions into intimate contact with a dilute sulphuric acid catalyst maintained at an effective and substantially uniform catalytic strength materially less than 45% acid and at a temperature of 250° to 300° C. and under a pressure in excess of about two thousand pounds to the square inch.

17. The method of producing ethyl alcohol in a continuous manner, which comprises passing a mixture of ethylene and water vapor in regulated proportions into intimate contact with a dilute aqueous phosphoric acid catalyst maintained at an effective and substantially uniform catalytic strength materially less than 45% acid and at a temperature not exceeding about 300° C., and under a pressure in excess of about one thousand pounds to the square inch, and continuously drawing off the resulting gases and vapors.

FLOYD J. METZGER.